United States Patent
Zhang et al.

(10) Patent No.: US 8,050,250 B2
(45) Date of Patent: Nov. 1, 2011

(54) RANDOM ACCESS METHOD FOR USER EQUIPMENT IN TIME DIVISION SYNCHRONIZATION CODE DIVISION MULTIPLE ACCESS COMMUNICATION SYSTEM

(75) Inventors: Yincheng Zhang, Shenzhen (CN); Xuejun Yang, Shenzhen (CN); Zijiang Ma, Shenzhen (CN); Zhifeng Ma, Shenzhen (CN)

(73) Assignee: ZTE Corporation (CN)

( * ) Notice: Subject to any disclaimer, the term of this patent is extended or adjusted under 35 U.S.C. 154(b) by 599 days.

(21) Appl. No.: 12/063,160

(22) PCT Filed: Jan. 18, 2006

(86) PCT No.: PCT/CN2006/000075
§ 371 (c)(1),
(2), (4) Date: Feb. 7, 2008

(87) PCT Pub. No.: WO2007/082407
PCT Pub. Date: Jul. 26, 2007

(65) Prior Publication Data
US 2010/0265965 A1    Oct. 21, 2010

(51) Int. Cl.
*H04J 3/06* (2006.01)
(52) U.S. Cl. .......................... 370/350; 370/510
(58) Field of Classification Search ............... 370/321, 370/314, 324, 337, 350, 509, 510, 511, 512–514
See application file for complete search history.

(56) References Cited

U.S. PATENT DOCUMENTS

| 5,850,392 | A  | * | 12/1998 | Wang et al. | 370/335 |
| 6,341,140 | B1 | * | 1/2002  | Lee et al.  | 375/130 |
| 6,549,564 | B1 | * | 4/2003  | Popovic     | 375/142 |

FOREIGN PATENT DOCUMENTS

| CN | 1401197 A  | 3/2003  |
| CN | 1497882 A  | 5/2004  |
| CN | 1533064 A  | 9/2004  |
| WO | 02/63775 A2 | 8/2001  |
| WO | 01/67620 A2 | 9/2001  |
| WO | 01/97411 A1 | 12/2001 |

\* cited by examiner

*Primary Examiner* — Brenda H Pham
(74) *Attorney, Agent, or Firm* — Brooks Kushman P.C.

(57) ABSTRACT

The present invention discloses a random access method for user equipment (UE) in time division synchronization code division multiple access (TD-SCDMA) communication system, including the following steps: (a) the system broadcasts the configured ASC and the configuration information thereof to the UE, the UE records these information; (b) the MAC of the UE sends RACH transmission request to the physical layer, the physical layer selects one RACH; (c) the physical layer of the UE randomly selects an uplink synchronization code and an uplink synchronization sub-channel; (d) after the physical layer of the UE transmits the selected uplink synchronization code in the uplink pilot time slot corresponding to the selected uplink synchronization sub-channel, if the UE receives the access confirmation message from the network, the UE completes the uplink synchronization and selects PRACH to send out the message, otherwise, the access to the network is re-performed. By using this invention, during the random access process of the UE in the TD-SCDMA system, the physical layer of the UE can select the resources configured by the system for the ASC, thereby meeting the QoS requirements and avoiding the generation of conflicts by all means.

12 Claims, 2 Drawing Sheets

RANDOM ACCESS METHOD FOR USER EQUIPMENT IN TIME DIVISION SYNCHRONIZATION CODE DIVISION MULTIPLE ACCESS COMMUNICATION SYSTEM

TECHNICAL FIELD

The present invention relates to the third generation mobile communication system, especially relates to a random access method for the user equipments (UE) in time division synchronization code division multiple access (TD-SCDMA) communication system.

TECHNICAL BACKGROUND

The random access process is an important process in radio communication system as well as an important phase in radio access process. In the TD-SCDMA radio communication system which is one of the third generation mobile communication systems, the random access process also includes an important uplink synchronization process.

The TD-SCDMA system adopts the technology of time division synchronization code division multiple access and it has a high demand for the uplink and downlink synchronization, especially for the uplink synchronization. In the TD-SCDMA system, uplink pilot time slot (UpPTS) and uplink synchronization code (SYNC_UL) are specifically defined to be used in uplink synchronization.

In the TD-SCDMA system, the random access process is a physical layer process, in which, an important step is to select the uplink synchronization code and its transmitting moment in UpPTS. This selection process is not only required by the uplink synchronization process, but more importantly, it is also the essence of random access process; this selection process is a concentrated reflect of the distribution method of competition sharing for the uplink common channel resource, i.e. physically random access channel (PRACH), in the random access process.

In the TD-SCDMA system, one cell is configured with eight uplink synchronization codes numbered of 0-7. During the random access process, the uplink synchronization code is also described as signature. During the random access process, if the user equipments (UE) select the same signature and transmit the signature at the same moment, namely in the UpPTS time slot of the same sub-frame, conflict will be generated and no response from the base station will be received, thereby causing the failure of the random access process.

For the TD-SCDMA system, in the broadcast message of the latest protocol "3GPP TS 25.331 V6.4.0", the configuration of the signature and UpPTS time slot resource (i.e. the transmission moment in the UpPTS time slot) is realized by Access Service Class (ASC) configuration information unit whose schematic structure is shown in FIG. 1, in which, available uplink synchronization codes (namely the signature), the number of sub-channels and available sub-channels are configured corresponding to each ASC value, the sub-channel is exactly the UpPTS time slot resource. In this method of configuration, the signature and the UpPTS time slot resource are configured as two independent resources.

In TD-SCDMA system, by way of defining different ASCs with each ASC configured with corresponding resources, different access service qualities are realized. In the TD-SCDMA system, there are totally eight classes of ASCs configured, from class 0 to class 7, and the resources configured for each ASC by the system include the UpPTS time slot resource and the signature used in the random access process. Meanwhile, on the UE side, the system defines totally sixteen classes of ACs (Access Class), from class 0 to class 15, and for each UE, one or more ACs can be configured. In the system broadcast message, the system broadcasts to the UE the number of configured ASCs, the signature that is configured for each ASC, and the UpPTS time slot resource, as well as the corresponding relationship between AC and ASC. The radio resource control (RRC) layer of the UE determines the corresponding ASC value based on the corresponding relationship and the configured AC value thereof, and configures the ASC value and other corresponding related resources to the media access layer. At the same time, the RRC layer of the UE configures the corresponding signature of each ASC and the UpPTS time slot resource to the physical layer. However, there is still no solution in the existing technology in respect to how the UE physical layer selects the resource configured by the system for the ASC in order to meet the QoS requirements and avoid the generation of conflicts by all means.

SUMMARY OF THE INVENTION

The technical problem to be solved in the present invention is to provide a random access method for user equipment (UE) in time division synchronization code division multiple access (TD-SCDMA) communication system, which enables the UE to select the resource configured by the system for the ASC during the random access process, thereby meeting the QoS requirements and avoiding the generation of conflicts by all means.

In order to solve the above technical problem, the present invention provides a method for the UE physical layer to select the uplink synchronization code and the moment of transmitting the uplink synchronization code in uplink pilot time slot in the TD-SCDMA communication system, including the following steps:

(A) the UE physical layer records the available uplink synchronization sub-channels and the available uplink synchronization codes configured for each access service class (ASC) in the system broadcast message;

(B) when the UE physical layer receives the transmission request of random access from media access control layer, it finds out the available uplink synchronization codes and the available uplink synchronization sub-channels for this access based on the ASC carried in the request;

(C) the UE physical layer randomly selects one of said available uplink synchronization codes as well as one of the available uplink synchronization sub-channels, so as to ensure that the sub-channel numbers selected by the UE in the cell are equally distributed among all sub-channels; and (D) the UE physical layer transmits the selected uplink synchronization code in the uplink pilot time slot corresponding to the selected uplink synchronization sub-channel.

Furthermore, in said step (C), when the UE physical layer selects one of said available uplink synchronization sub-channels, if the number of the available uplink synchronization sub-channels is one, then this uplink synchronization sub-channel is selected; if the number of the available uplink synchronization sub-channels is more than one, then the UE physical layer randomly selects one available uplink synchronization sub-channel and makes each available uplink synchronization sub-channel have the same probability of being selected.

Furthermore, in said step (C), when the UE physical layer selects one of said available uplink synchronization sub-channels, if the number of the available uplink synchronization sub-channels is one, then this uplink synchronization sub-channel is selected; if the number of the available uplink synchronization sub-channels Num is more than one, then the UE physical layer numbers the identities of the available uplink synchronization sub-channels in ascending order, makes j=IMSI mod Num, and selects the uplink synchronization sub-channel with its number being j, in which IMSI is the international mobile subscriber identity of the UE.

Furthermore, in said step (D), the uplink pilot time slot corresponding to the uplink synchronization sub-channel is determined by the following method: the UE physical layer configures the sub-frame number SFN' to be 0 when the frame with the system frame number SFN being 0 starts, obtains the required sub-frame number SFN' based on the counting for each sub-frame, then performs SFN' mod N operation and takes the result as the sub-channel number, then this sub-channel number corresponds to the uplink pilot time slot of the sub-frame number; the value of N is the number of the uplink synchronization sub-channels configured by the system.

In order to solve the above technical problem, the present invention also provides a random access method for user equipment (UE) in time division synchronization code division multiple access (TD-SCDMA) communication system, including the following steps:

(a) the system broadcasts to the UE the configured access service class (ASC) and the available uplink synchronization codes and the uplink synchronization sub-channels configured for each ASC, the UE records these information on its physical layer after receiving the information;

(b) the media access control layer of the UE sends a transmission request of random access to the physical layer which comprises the information of transmission format, ASC and transmission block sets to initiate the random access, the physical layer first selects a random access transmission channel according to said transmission format;

(c) according to the ASC in the request, the UE physical layer randomly selects one of the uplink synchronization codes configured for said ASC, and selects one of the available uplink synchronization sub-channels configured for said ASC;

(d) the UE physical layer transmits the selected uplink synchronization code in the uplink pilot time slot corresponding to the selected uplink synchronization sub-channel, and senses whether the access confirmation message from the network is received on the forward physical access channel, if so, the UE physical layer completes the uplink synchronization and selects the physical random access channel to transmit the message, otherwise, the next step is performed; and (e) The access to the network is re-performed.

Furthermore, in said step (e), when the access to the network is re-performed, the UE physical layer randomly reselects one of said available uplink synchronization codes and one of said available uplink synchronization sub-channels, then step (d) is performed.

Furthermore, in said step (e), when the access to the network is re-performed, the UE physical layer randomly re-selects one of said available uplink synchronization codes and keeps the uplink synchronization sub-channel unchanged, then step (d) is performed.

Furthermore, in said step (e), when the access to the network is re-performed, the UE physical layer randomly re-selects one of said available uplink synchronization sub-channels and keeps the uplink synchronization code unchanged, then step (d) is performed.

Furthermore, the UE physical layer selects one of the available sub-channels by the following way: if the number of the available sub-channels is one, then the UE physical layer selects this sub-channel; if the number of the available sub-channels Num is more than one, then the UE physical layer randomly selects one available sub-channel and ensures each available sub-channel has the same probability of being selected; alternatively, when Num is more than 1, the UE physical layer numbers the identities of the available sub-channels in ascending order, makes j=IMSI mod Num, then selects the uplink synchronization sub-channel with its number being j, in which IMSI is the international mobile subscriber identity of the UE.

Furthermore, in said step (e), the uplink pilot time slot corresponding to the uplink synchronization sub-channel is determined by the following method: the UE physical layer configures the sub-frame number SFN' as zero when the frame with the system frame number SFN being 0 starts, then it obtains the required sub-frame number SFN' based on the counting for each sub-frame; it performs SFN' mod N operation and takes the result as the sub-channel number, then this sub-channel number corresponds to the uplink pilot time slot of the sub-frame number, then the sub-channel number corresponds to the uplink pilot time slot of the sub-frame number, in which, the value of N is the number of the uplink synchronization sub-channels configured by the system.

Compared with the prior art, this invention enables the UE physical layer to select the resource configured by the system for the ASC during the random access process in the TD-SCDMA system, thereby meeting the QoS requirements and avoiding the generation of conflicts by all means.

PREFERRED EMBODIMENTS OF THE INVENTION

In the following, this invention will be described in detail in combination with the accompanying drawings and specific embodiments, which, however, shall not be regarded as a limitation to this invention.

The TD-SCDMA system in the present invention employs the configuration method of protocol "3GPP TS 25.331 V6.4.0", i.e. to independently configure the uplink synchronization code and the uplink synchronization sub-channel (including the number of sub-channels and the available sub-channels) in ASC configuration information unit.

Figure 1:
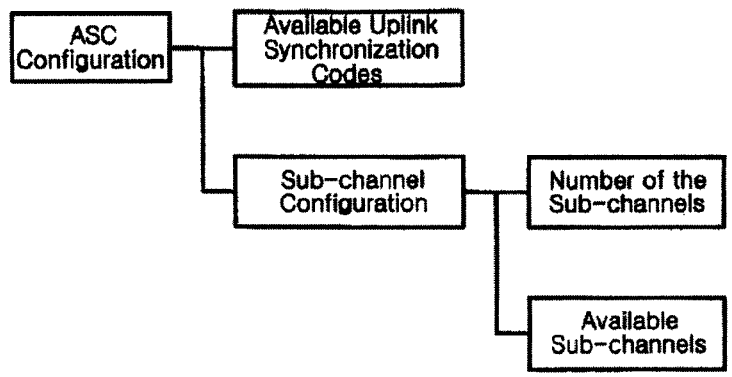
FIG. 1 is the structure diagram for ASC configuration information unit.
Figure 2:
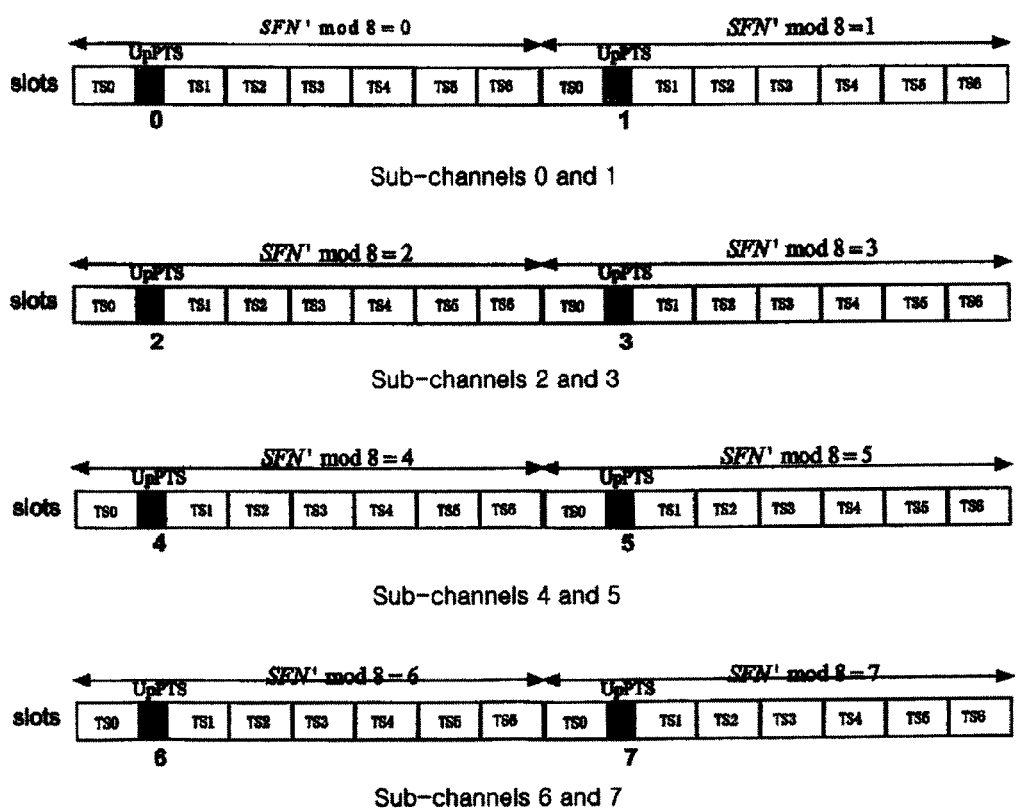
FIG. 2 is the schematic diagram of UpPTS sub-channel with N=8 according to the embodiment of this invention.

FIG. 2 is the schematic diagram for the relationship between the UpPTS time slot and the uplink synchronization sub-channel of the system, in which, it is configured that the number N of the uplink synchronization sub-channels is eight and the uplink pilot time slot includes eight sub-channels numbered from 0 to 7.

When SFN' mod 8=0, the UpPTS time slot of said sub-frame is the $0^{th}$ sub-channel;

When SFN' mod 8=1, the UpPTS time slot of said sub-frame is the $1^{st}$ sub-channel;

. . .

When SFN' mod 8=7, the UpPTS time slot of said sub-frame is the $7^{th}$ sub-channel;

wherein, SFN' is the sub-frame number used for counting the number of the radio sub-frames. The TD-SCDMA system needs to maintain SFN, namely the system frame number used for counting the number of the radio frames; the number of each radio frame is added by one and is cycle counted between 0~4095. Meanwhile, the physical layer of TD-SCDMA system includes the network and the UEs, and the maintenance for SFN' is needed. In the TD-SCDMA system, one radio frame comprises two radio sub-frames; the physical layer sets SFN' as zero as soon as the frame with the system frame number SFN being 0 starts, then each sub-frame is counted in ascending order to 8191 so as to obtain the required sub-frame number SFN'. The UE physical layer establishes the corresponding relationship between the selected sub-channel and the UpPTS time slot of a certain sub-frame according to the sub-frame number so as to transmit the uplink synchronization code; The SFN' is performed by mod 8 operation and the result is taken as the sub-channel number, then this sub-channel number corresponds to the uplink pilot time slot of the sub-frame number.

Figure 3:
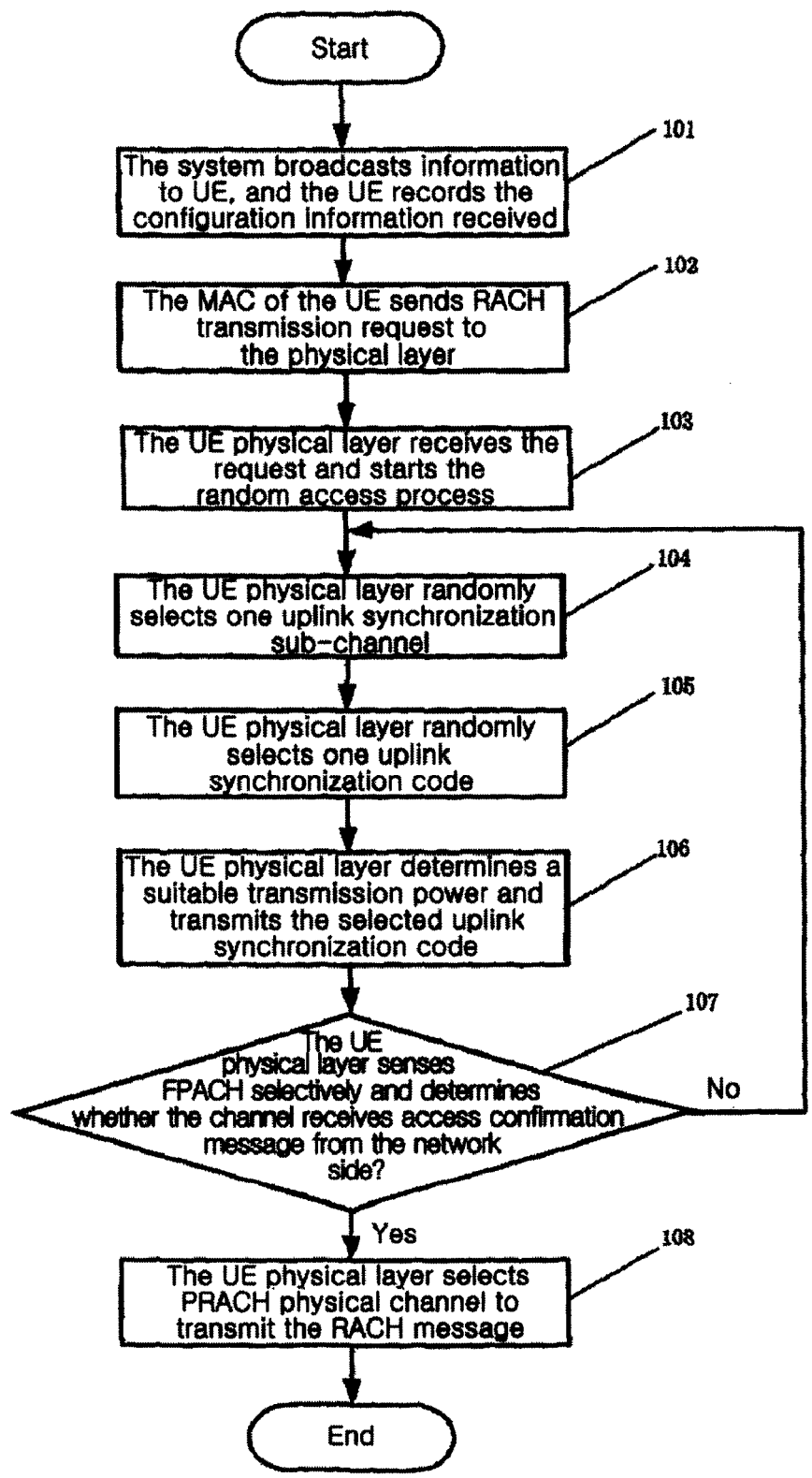
FIG. 3 is the flow chart for the random access method on the UE side according to the embodiment of this invention.

As shown in FIG. 3, in the present embodiment, the method for the UE to complete the random access process based on the configuration resource broadcasted by the system includes the following steps:

Step 101: the system broadcasts to the UE the number of the ASCs configured, the uplink synchronization codes, and the uplink synchronization sub-channels configured for each ASC, along with the corresponding relationship between AC and ASC, the UE records these configuration information after receiving them, wherein the physical layer needs to record the uplink synchronization codes and the uplink synchronization sub-channel information (including the number of the sub-channels and the available sub-channels) configured for each ASC;

Step 102: the media access control (MAC) layer of the UE sends a transmission request of random access channel (RACH) to the physical layer, the request comprises the transmission format, the access service class ASC, the transmission data (the transmission block sets) etc used by PRACH message; this step is the same as the prior art.

Step 103: after the UE physical layer receives the transmission request of random access, it starts the random access process, and it exclusively selects a RACH transmission channel based on the transmission format instructed by MAC layer;

Step 104: based on the ASC value in the message, the UE physical layer randomly selects a sub-channel from one or more available uplink synchronization sub-channels that are configured for said ASC value, the randomness function of the UE physical layer makes each optional sub-channel have the same probability of being selected, as such the sub-channels selected by the UE in the cell are roughly equally distributed in the cell;

For example, when the UE physical layer selects the sub-channel, it can firstly generate a random number R, and meanwhile, it numbers the sub-channels in ascending order as 0, 1, . . . , Num−1 according to the identities of the sub-channels, wherein, Num represents the number of the available uplink synchronization sub-channels, which is less than or equal to seven, then it selects sub-channel j according to the computing result of equation R mod Num=j. Since the random number itself satisfies the even distribution, the sub-channel number selected by the UE also satisfies the even distribution with respect to the whole cell. Such a method of random selection is applied a lot in the prior art, so it is not defined in this invention.

In another embodiment, the UE physical layer can also select one sub-channel from a plurality of available uplink synchronization sub-channels by using the following method: the UE physical layer numbers the sub-channels in ascending order as 0, 1, . . . , Num−1 according to the identities of the sub-channels, wherein Num represents the number of the available uplink synchronization sub-channels, which is less than or equal to seven, then the calculation is performed for the following equation:

$$IMSI \bmod Num=j,$$

finally, it selects the sub-channel j. Wherein IMSI is the international mobile subscriber identity for the UE. Due to the fact that the IMSI number of the UE within one cell is random and roughly equally distributed, by using this method, the sub-channel number selected by the UE within one cell is also roughly equally distributed in the whole cell.

Step 105: the UE physical layer randomly selects one uplink synchronization code from the available uplink synchronization codes configured for said ASC, the randomness function of the UE physical layer ensures each optional uplink synchronization code have the same probability of being selected;

Step 106: the UE physical layer determines the suitable transmission power and transmits the selected uplink synchronization code in the UpPTS time slot corresponding to the selected uplink synchronization sub-channel; how to determine the relationship between the uplink synchronization sub-channel and the UpPTS time slot has already been introduced in the above text;

Step 107: the UE physical layer senses the forward physical access channel (FPACH) selectively, if it receives the access confirmation message from the network in said channel, then the uplink synchronization is completed and the UE physical layer will perform the next step, if it does not receive the confirmation message, which means that random access conflict occurs, the network access needs to be reprocessed, it is to return to perform step 104; and Step 108: the UE physical layer selects PRACH physical channel to transmit the message in RACH.

In step 108 of the another embodiment, when the UE physical layer does not receive the access confirmation message in the FPACH channel from the network and it reprocesses the network access, it can either keep the uplink synchronization sub-channel unchanged and only reselects one uplink synchronization code, or keep the uplink synchronization code unchanged and only reselects one uplink synchronization sub-channel.

It needs to be pointed out that since the selection of the uplink synchronization code and the selection of the uplink synchronization sub-channel are independent, in another embodiment, the steps 104 and 105 above are interchangeable, i.e., to select the uplink synchronization code first and select the uplink synchronization sub-channel thereafter, while the other steps are similar.

INDUSTRIAL APPLICABILITY

This invention enables the UE physical layer to select the resource configured by the system for the ASC during the random access process for the UE in TD-SCDMA system, thereby meeting the QoS requirements and avoiding the generation of conflicts by all means.

What we claim is:

1. A selection method for user equipment physical layer to select uplink synchronization code and its transmission moment in uplink pilot time slot in time division synchronization code division multiple access communication system, comprising the following steps of:

(A) the user equipment physical layer records available uplink synchronization codes and available uplink synchronization sub-channels configured for each access service class in a system broadcast message;

(B) when the user equipment physical layer receives a transmission request of a random access from a media access control layer, the user equipment physical layer finds out the available uplink synchronization codes and the available uplink synchronization sub-channels for this current access based on the access service class carried in the request;

(C) the user equipment physical layer randomly selects one of said available uplink synchronization codes as well as one of said available uplink synchronization sub-channels, ensuring that numbers of the sub-channels selected by the user equipment in a cell are equally distributed among all sub-channels; and (D) the user equipment physical layer transmits the selected uplink synchronization code in the uplink pilot time slot corresponding to the selected uplink synchronization sub-channel.

2. The selection method of claim 1, wherein in said step (C), when the user equipment physical layer selects one of the available uplink synchronization sub-channels, if a number of the available uplink synchronization sub-channels is one, then this uplink synchronization sub-channel is selected; if the number of the available uplink synchronization sub-channels is more than one, then the user equipment physical layer randomly selects an available uplink synchronization sub-channel and makes each optional available sub-channel have a same probability of being selected.

3. The selection method of claim 1, wherein in said step (C), when the user equipment physical layer selects one of said available uplink synchronization sub-channels, if the number of the available uplink synchronization sub-channels is one, then this uplink synchronization sub-channel is selected; if the number of the available uplink synchronization sub-channels is more than one, then the user equipment physical layer numbers the available uplink synchronization sub-channels in ascending order as 0, 1, . . . , Num-1 according to identities of the available uplink synchronization sub-channels, in which Num represents the number of the available uplink synchronization sub-channels, and selects the available uplink synchronization sub-channel with the number of the available uplink synchronization sub-channels being j according to the computing result of an equation j=IMSI mod Num, in which IMSI is international mobile subscriber identity of the user equipment.

4. The selection method of claim 1, wherein in said step (D), the uplink pilot time slot corresponding to the uplink synchronization sub-channel is determined by a following method: the user equipment physical layer sets sub-frame number SFN' as 0 when a frame with a system frame number SFN being 0 starts, count each sub-frame in ascending order to obtain a required sub-frame number SFN', then takes a result of an equation SFN' mod N as a sub-channel number, then the sub-channel number corresponds to the uplink pilot time slot of the sub-frame number, in which, a value of N is the number of the uplink synchronization sub-channels configured by the system.

5. A random access method for user equipment in time division synchronization code division multiple access communication system, comprising the following steps of:

(a) the user equipment receives information of configured access service class, and available uplink synchronization code and uplink synchronization sub-channel configured for each access service class broadcasted by the system, and records these information on the user equipment physical layer;

(b) a media access control layer of the user equipment sends a transmission request of a random access to the physical layer to initiate a random access, including the information of transmission format, access service class and transmission block sets, the physical layer firstly selects a random access transmission channel based on said transmission format;

(c) the user equipment physical layer, according to the access service class in the request, randomly selects one of the uplink synchronization codes configured for said access service class, and selects one of the available uplink synchronization sub-channels configured for said access service class;

(d) the user equipment physical layer transmits the selected uplink synchronization code in an uplink pilot time slot corresponding to the selected uplink synchronization sub-channel, and senses whether an access confirmation message from a network is received on a forward physical access channel, if so, the user equipment completes the uplink synchronization and selects a physical random access channel to transmit the message, otherwise, step (e) is performed; and (e) an access to the network is re-performed.

6. The random access method of claim 5, wherein in said step (e), when the access to the network is re-performed, the user equipment physical layer randomly reselects one of said available uplink synchronization codes and reselects one of said available uplink synchronization sub-channels, then step (d) is performed.

7. The random access method of claim 5, wherein in said step (e), when the access to the network is re-performed, the user equipment physical layer randomly reselects one of said available uplink synchronization codes and keeps the uplink synchronization sub-channel unchanged, then step (d) is performed.

8. The random access method of claim 5, wherein in said step (e), when the access to the network is re-performed, the user equipment physical layer reselects one of said available uplink synchronization sub-channels and keeps the uplink synchronization code unchanged, then step (d) is performed.

9. The random access method of claim 5, wherein the user equipment physical layer selects one of said available uplink synchronization sub-channels by a following way: if the number of the available uplink synchronization sub-channels is one, then the user equipment physical layer selects this uplink synchronization sub-channel; if the number of the available uplink synchronization sub-channels is more than one, then the user equipment physical layer randomly selects one available uplink synchronization sub-channel and makes each optional uplink synchronization sub-channel have a same probability of being selected; alternatively, when the number of the available uplink synchronization sub-channels is more than one, the user equipment physical layer numbers the available uplink synchronization sub-channels in ascending order as 0, 1, . . . , Num-1 according to identities of the available uplink synchronization sub-channels, in which Num represents the number of the available uplink synchronization sub-channels, and selects the available uplink synchronization sub-channel with the number of the available uplink synchronization sub-channels being j according to the computing result of an equation j=IMSI mod Num, in which IMSI is international mobile subscriber identity of the user equipment.

10. The random access method of claim 5, wherein in said step (e), the uplink pilot time slot corresponding to the uplink synchronization sub-channel is determined by a following method: the user equipment physical layer configures sub-frame number SFN' as zero when a frame with a system frame number SFN being 0 starts, count each sub-frame in ascending order to obtain a required sub-frame number SFN', takes a result of an equation SFN' mod N as a sub-channel number, then the sub-channel number corresponds to the uplink pilot time slot of the sub-frame number, in which the value of N is the number of the uplink synchronization sub-channels configured by the system.

11. The random access method of claim 6, wherein the user equipment physical layer selects one of said available uplink synchronization sub-channels by a following way: if the number of the available uplink synchronization sub-channels is one, then the user equipment physical layer selects this uplink synchronization sub-channel; if the number of the available uplink synchronization sub-channels is more than one, then the user equipment physical layer randomly selects one available uplink synchronization sub-channel and makes each optional uplink synchronization sub-channel have a same probability of being selected; alternatively, when the number of the available uplink synchronization sub-channels is more than one, the user equipment physical layer numbers the available uplink synchronization sub-channels in ascending order as 0, 1, . . . , Num-1 according to identities of the available uplink synchronization sub-channels, in which Num represents the number of the available uplink synchronization sub-channels, and selects the available uplink synchronization sub-channel with the number of the available uplink synchronization sub-channels being j according to the computing result of an equation j=IMSI mod Num, in which IMSI is international mobile subscriber identity of the user equipment.

12. The random access method of claim 8, wherein the user equipment physical layer selects one of said available uplink synchronization sub-channels by a following way: if the number of the available uplink synchronization sub-channels is one, then the user equipment physical layer selects this uplink synchronization sub-channel; if the number of the available uplink synchronization sub-channels is more than one, then the user equipment physical layer randomly selects one available uplink synchronization sub-channel and makes each optional uplink synchronization sub-channel have a same probability of being selected; alternatively, when the number of the available uplink synchronization sub-channels is more than one, the user equipment physical layer numbers the available uplink synchronization sub-channels in ascending order as 0, 1, . . . , Num-1 according to identities of the available uplink synchronization sub-channels, in which Num represents the number of the available uplink synchronization sub-channels, and selects the available uplink synchronization sub-channel with the number of the available uplink synchronization sub-channels being j according to the computing result of an equation j=IMSI mod Num, in which IMSI is international mobile subscriber identity of the user equipment.

* * * * *